(12) United States Patent
Chonan

(10) Patent No.: US 7,735,937 B2
(45) Date of Patent: Jun. 15, 2010

(54) QUICK RELEASE AXLE ASSEMBLY

(75) Inventor: Yoshiya Chonan, Chiba (JP)

(73) Assignee: Sakae Engineering Inc., Chiba-ken (JP)

( * ) Notice: Subject to any disclaimer, the term of this patent is extended or adjusted under 35 U.S.C. 154(b) by 82 days.

(21) Appl. No.: 12/073,796

(22) Filed: Mar. 10, 2008

(65) Prior Publication Data

US 2009/0140571 A1    Jun. 4, 2009

(30) Foreign Application Priority Data

Nov. 29, 2007    (JP) .............................. 2007-309405

(51) Int. Cl.
*B60B 37/00*    (2006.01)
(52) U.S. Cl. ................................... 301/124.2
(58) Field of Classification Search ............... 301/124.2, 301/110.5; 280/279, 288; 403/374.1–374.5
See application file for complete search history.

(56) References Cited

U.S. PATENT DOCUMENTS 7,090,308 B2 *    8/2006   Rose et al. ................ 301/124.2
7,494,145 B2 *    2/2009   Schroeder et al. ........ 301/124.2

* cited by examiner

*Primary Examiner*—Jason R Bellinger
(74) *Attorney, Agent, or Firm*—Rabin & Berdo, PC

(57) ABSTRACT

An axle assembly includes a first holding member, and a second holding member with a collet shape on a tubular body. The second holding member is inserted into a penetrating hole of a shaft mounting portion so as to reduce its diameter. The tubular body is directly inserted into the penetrating hole. When moving the fastening bar by operation of the cam lever, both holding members nip and hold the shaft mounting portion. While dismantling, a diameter shrinking part moves so as to reduce a diameter of the second holding member.

1 Claim, 6 Drawing Sheets

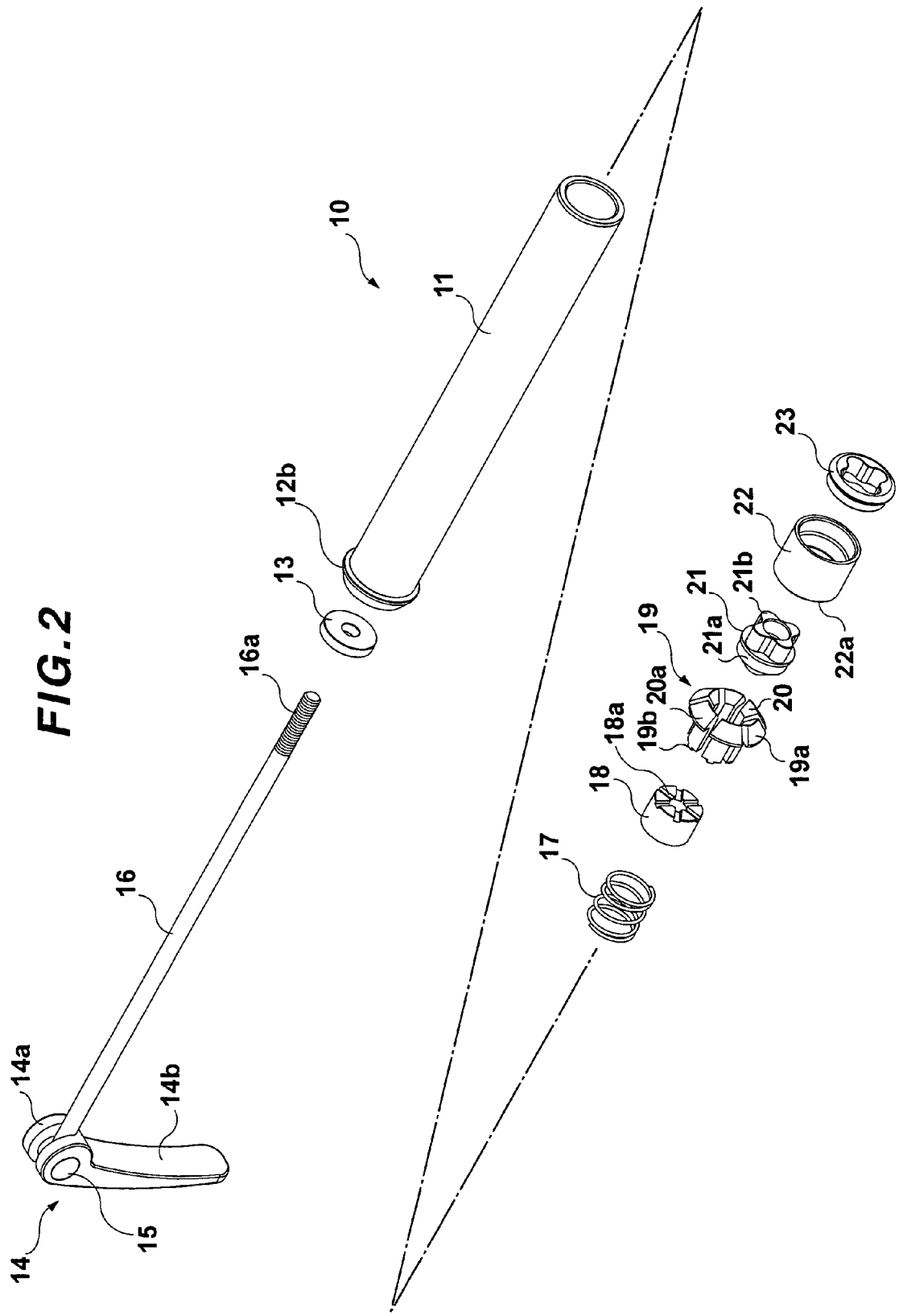

QUICK RELEASE AXLE ASSEMBLY

BACKGROUND OF THE INVENTION

1. Field of the Invention

The present invention relates to an axle assembly to mount a wheel hub of a bicycle to a front fork or a suspension fork.

2. Related Background Art

A conventional axle assembly has a tubular body and a pair of holding members with a flange shape. In the conventional axle assembly, both ends of the tubular body are inserted into respective penetrating holes of a pair of shaft mounting portions (i.e. dropouts) furnished below a suspension fork; the respective holding members are screwed into both ends of the tubular body; and the holding members are used to nip and hold the pair of shaft mounting portions. The tubular body is thus installed on the pair of the shaft mounting portions. The tubular body rotatably supports a hub of a wheel.

The shaft mounting portions to mount such a conventional axle assembly are formed into two separate structures in order to enable the diameter of the penetrating holes of the shaft mounting portions to be reduced. After the tubular body is inserted into the penetrating hole, through integrating them by tightness of a fastening bolt so as to shrink a diameter of the penetrating hole, the tubular body is strongly fixed.

However, as stated above, when screwing the holding member or performing the tightening of the fastening bolt, there is a problem that not only is a wrench needed, but also time and exertion are needed for mounting and dismantling of the tubular body.

Recently, by furnishing slotted fingers for expanding a diameter at both ends of the tubular body, a fastening bar furnished on the tubular body can be moved by a lever operation of a cam lever. Diameters of the both ends of the tubular body via the slotted fingers are expanded by pressing a taper washer connected to the fastening bar into both ends of the tubular body. Peripheral surfaces of both ends of the tubular body are squeezed onto wall surfaces of the penetrating holes of the shaft mounting portions. Thus, the axle assembly having a structure in which the tubular body is installed on the shaft mounting portion is used practically.

This axle assembly can dismantle the tubular body from the shaft mounting portions by restoring the cam lever to an open position and taking off the taper washer from the fastening bar, and it has a comparatively simple structure for mounting and dismantling. However, since there are slotted fingers at both ends of the tubular body, there is a drawback that the strength of the tubular body becomes weak.

SUMMARY OF THE INVENTION

It is, therefore, an objective of the invention to provide an axle assembly capable of solving the above problem. That is, the present invention has an objective to provide an axle assembly which enables to simply perform mounting and dismantling works with respect to shaft mounting portions and has excellent mechanical strength.

According to the present invention, there is provided an axle assembly having a tubular body whose both ends are inserted into respective penetrating holes formed on a pair of shaft mounting portions, and rotatably supports wheel hub, comprising:

a holding means that is installed on one end of the tubular body and is used for pressing edge of the penetrating hole of the shaft mounting portion on one side;

a fastening bar that passes through the holding means and is placed inside the tubular body;

a moving means that is placed to face to the holding means, is connected to one end of the fastening bar, and makes the fastening bar move inside the tubular body towards one end of the tubular body;

a holding means with collet shape that has plural partition pieces and protrudes from other end of the tubular body so as to make the plural partition pieces can expand and shrink diameter;

a pressing means that is connected to other end of the fastening bar, presses the and holding means with collet shape by movement of the fastening bar, and presses the respective partition pieces to edge of the penetrating hole of the shaft mounting portion on the other side; and a diameter shrinking means that is installed on the pressing means so as to enable to move towards the other end of the tubular body, and couples with the plural partition pieces by moving so as to shrink diameter.

EFFECT OF THE PRESENT INVENTION

According to the present invention, because the holding member with collet shape contacts to the wall surface of the penetrating hole of the shaft mounting portion and shrinks diameter, the tubular body and the holding member can be directly inserted into the penetrating hole. In addition, through shrinking diameter of the holding member with collet shape by a moving operation of the diameter shrinking means, the tubular body can be taken off from the penetrating holes. Therefore, it is possible to perform the installing and dismantling works simply. In addition, according to the present invention, because the pair of shaft mounting portions are nipped and held by two holding members without designing slotted fingers on the tubular body, the strength of installation is improved.

The above and other objects and features of the present invention will become apparent from the following detailed description and the appended claims with reference to the accompanying drawings.

BRIEF DESCRIPTION OF THE DRAWINGS

FIG. 2 is a disassembled oblique view of an axle assembly;

DETAILED DESCRIPTION OF THE PREFERRED EMBODIMENTS

Embodiment

Embodiments of the invention will be described in detail hereinbelow with reference to the drawings.

Figure 6:
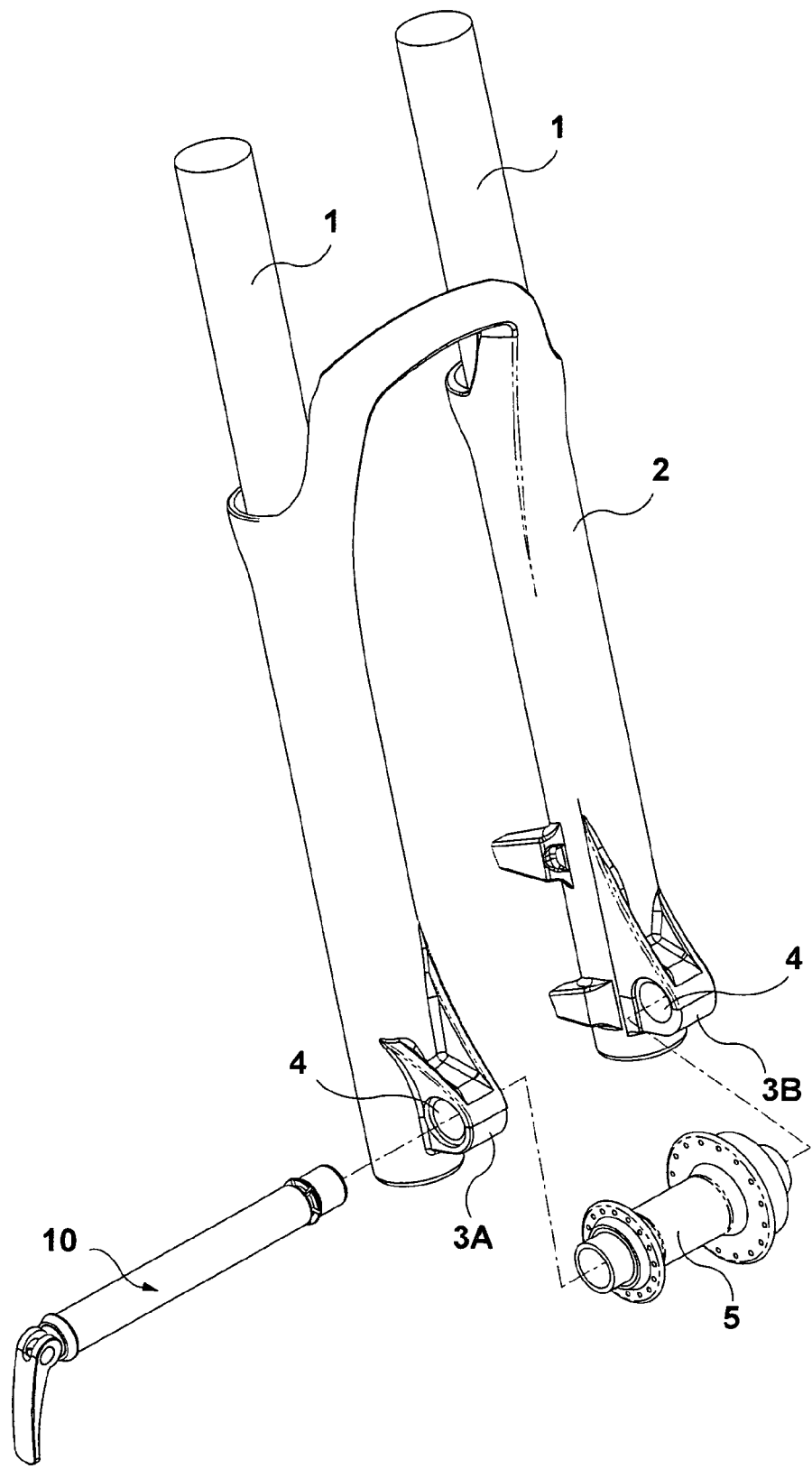
FIG. 6 is an oblique view of fork structure related to the present invention.

FIG. 6 is an oblique view of a fork structure with an axle assembly 10 related to the present invention being installed.

In FIG. 6, 1 shows front fork. On the front fork 1, a suspension fork 2 with a reverse U-shape is installed. On lower portions of respective forks of the suspension fork 2, shaft mounting portions 3A and 3B are mounted. On the shaft mounting portions 3A and 3B, a penetrating hole 4 is respectively formed. An axle assembly 10 is passed through the penetrating hole 4 of the shaft mounting portion 3A on one side and is inserted into and passed through hub 5. Further, the axle assembly is passed though the penetrating hole 4 of the shaft mounting portion 3B on the other side.

Figure 1:
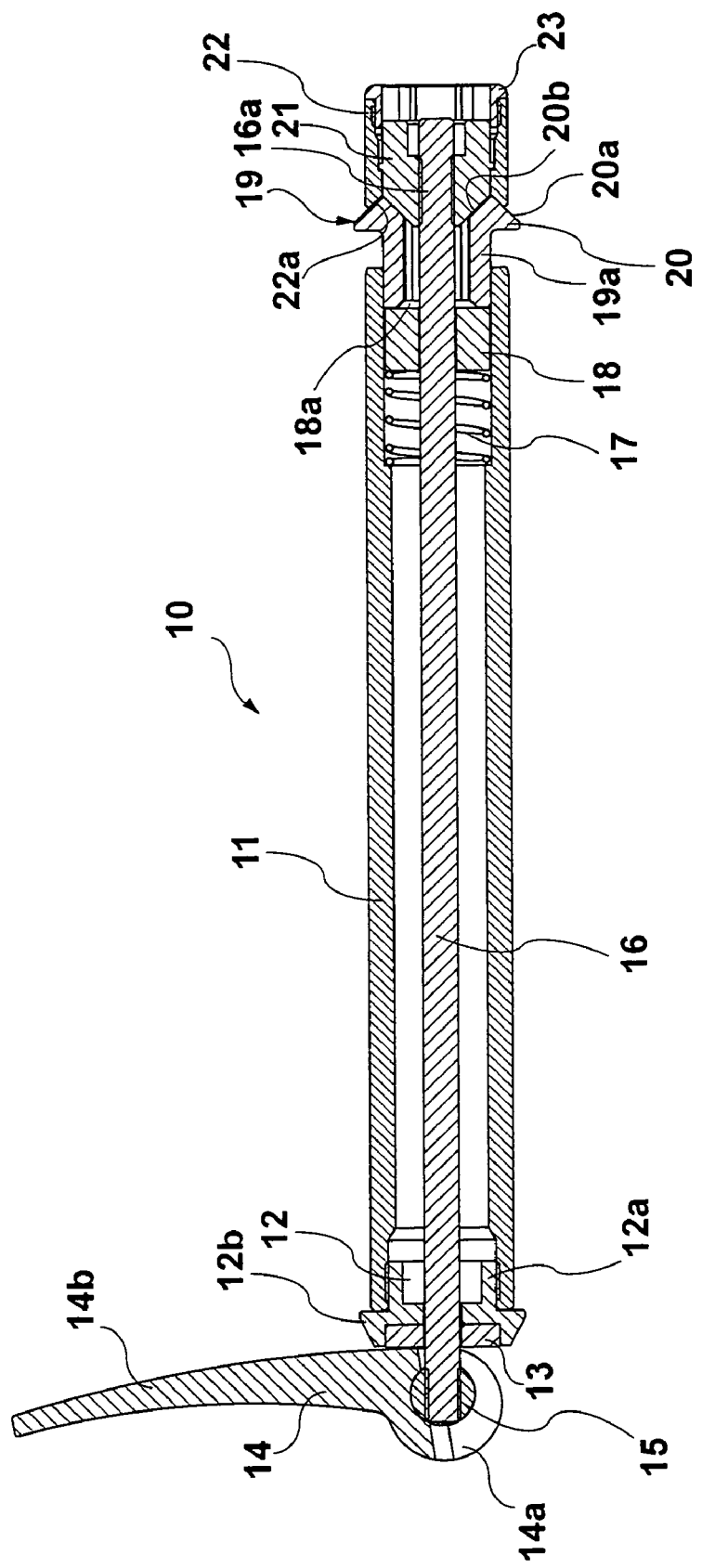
FIG. 1 is a sectional view of an axle assembly related to the present invention.

FIG. 1 is a sectional view of the axle assembly 10 in the present invention, and FIG. 2 is a disassembled oblique view of the axle assembly 10.

The axle assembly 10 has a tubular body 11 as shown in FIG. 1 and FIG. 2. A nipping and holding member 12 is screwed into an opening of one end of the tubular body 11. The holding member 12 has a tubular screwed part 12a and a flange part 12b which protrudes in a radial direction while closing the opening. A sliding and contacting use plate 13 is fit to a concave of the flange part 12b.

The sliding and contacting use plate 13 is made from plastic, and is used to enable a cam lever 14 to slide smoothly. The cam lever 14 is composed of a cam part 14a and a lever 14b. The cam part 14a has a camshaft 15 eccentrically arranged. One end of a fastening bar 16 is inserted into the camshaft 15 and is fixed. The fastening bar 16 goes through the sliding and contacting use plate 13 and the screwed part 12a of the holding member 12, and is coaxially arranged inside the tubular body 11. The other end of the fastening bar 16 protrudes from the tubular body 11. A screw slot (thread) 16a is furnished on the other end of the fastening bar 16.

The inner wall of other end of the tubular body 11 is formed with a reduced thickness through a recess section. One end of a coil spring 17 contacts with a shoulder defined by the recess section. A cylindrical guide block 18 presses on the other end of the coil spring 17. As shown in FIG. 2, on the guide block 18, six strips of guide grooves 18a radiating along a radius direction are formed.

The guide grooves 18a of the guide block 18 are used to expand or shrink a diameter of the holding member 19 with a collet shape. That is, the holding member 19 is composed of six partition pieces 19a that protrude from the other end of the tubular body 11 and are arranged in a concentric arrangement. Each partition piece 19a includes a flange part 20 having a slant surface 20a, and a protuberance 19b fitting to the respective guide groove 18a.

A pressing member 21 is arranged to face the holding member 19. The pressing member 21 is threaded to the fastening bar 16 using thread 16a, and is composed of a taper part 21a and a serration shaft 21b for pressing respective inside slant surfaces 20b of the plural partition pieces 19a.

A tubular shrinking member 22 is mounted on the pressing member 21. The shrinking member 22 is fit to the pressing member 21 so as to be able to move towards the holding member 19. An inside taper surface 22a is formed at a front end of the shrinking member 22 for pressing respective slant surfaces 20a on the flange parts 20 of the plural partition pieces 19a. A serration boss 23 is screwed into a rear end of the shrinking member 22. The serration boss 23 is movably fit to the serration shaft 21b so as to allow the shrinking member 22 to move.

In the axle assembly 10 of the present invention having the above-mentioned structure, as shown in FIG. 1, when the cam lever 14 is located in the open position, the holding member 19 with collet shape moves away from the holding member 12.

Next, the operation of the axle assembly 10 in the present invention will be explained together with a usage pattern.

Figure 3A:
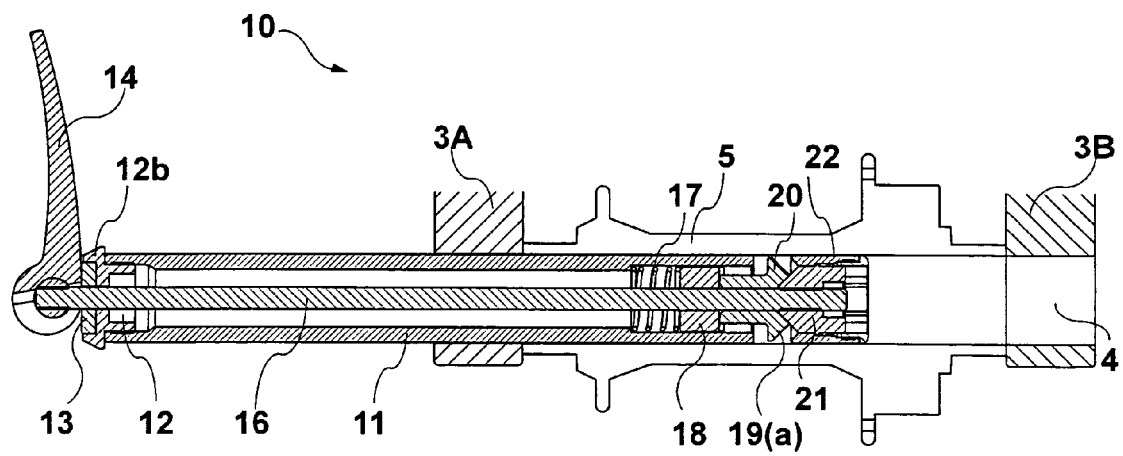
FIG. 3A to FIG. 3C are sectional views for explaining mounting of this assembly onto shaft mounting portion and its movement.
Figure 3B:
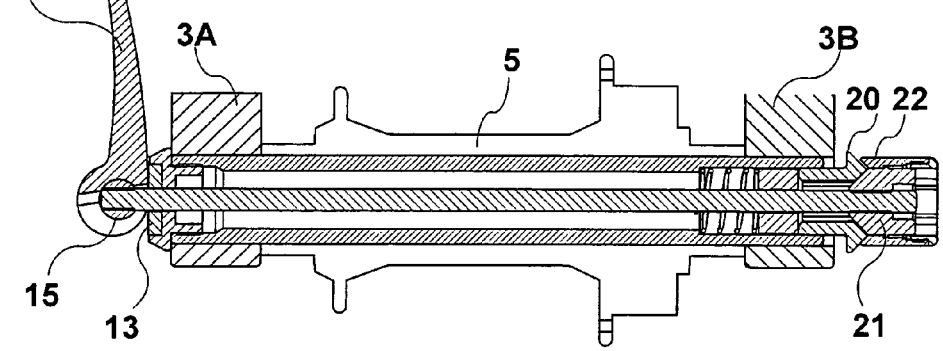
Figure 3C:
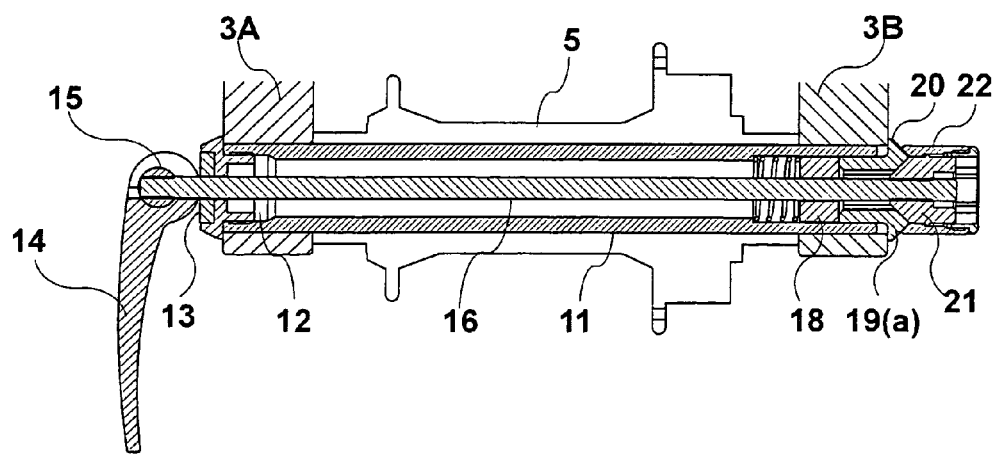

FIG. 3A to FIG. 3C are sectional views for explaining mounting order of the axle assembly 10.

Firstly, as shown in FIG. 3A, the axle assembly 10 is inserted into the penetrating hole 4 of the shaft mounting portion 3A from the side of the shrinking member 22, and is sequentially inserted into a hub 5 and the shaft mounting portion 3B. During the aforesaid inserting operation, in the nipping and holding member 19 with collet shape, the slant surfaces 20a of the flange parts 20 of the partition pieces 19a slidably contact with the inner wall surface of the penetrating hole 4 and with the inner wall surface of the hub 5. The respective partition pieces 19a are guided by the guide grooves 18a of the guide block 18 and approach each other. That is, because the holding member 19 automatically reduces its diameter, it is possible to make the axle assembly 10 pass through the both penetrating holes 4 and the hub 5 only by pushing and pressing the axle assembly 10.

Next, as shown in FIG. 3B, after the axle assembly 10 is pushed and pressed, the flange part 12b of the holding member 12 on one side contacts with the edge of a penetrating hole of the shaft mounting portion 3A, and it becomes impossible to further move the assembly. In such a state, the flange part 20 of the holding member 19 with collet shape on the other side protrudes from the shaft mounting portion 3B, and the respective partition pieces 19a expand and are kept in a diameter expansion state.

Next, as shown in FIG. 3C, the cam lever 14 is activated to rotate downward. By this operation, the cam part 14a slidably contacts with the sliding and contacting use plate 13 while rotating. The camshaft 15 thus moves away from the sliding and contacting use plate 13, and the fastening bar 16 axially moves a corresponding distance. Accordingly, because the pressing member 21 also moves and presses the holding member 19 with collet shape due to the taper part 21a, the holding member 19 (plural partition pieces 19a) moves against a resilience of the coil spring 17 while expanding its diameter. Therefore, because the flange part 20 of the holding member 19 is pressed to the edge of the penetrating hole 4 of the shaft mounting portion 3B, the axle assembly 10 of the present invention can be mounted onto the suspension fork 2.

Next, a dismantling operation of the axle assembly 10 of the present invention will be explained by referring to FIG. 4.

Figure 4A:
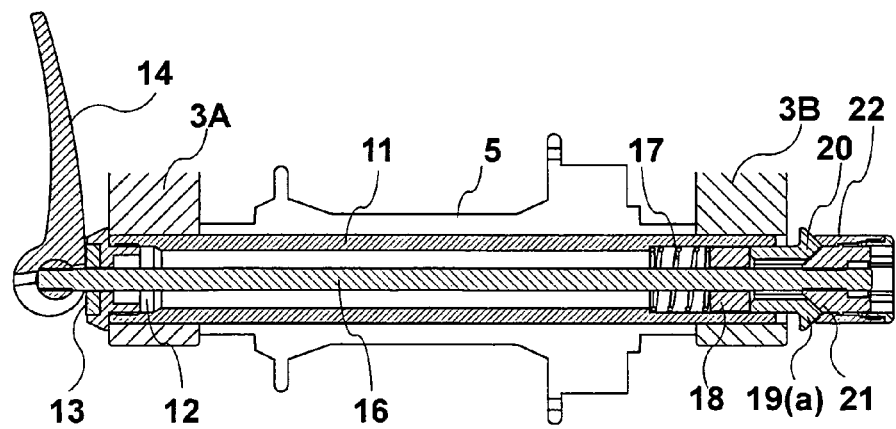
FIG. 4A to FIG. 4C are diagrams for explaining dismantling of this assembly from the shaft mounting portion and its movement.

Firstly, as shown in FIG. 4A, the cam lever 14 is activated to rotate upward. By this operation, the flange part 20 of the holding member 19 with collet shape ceases to nip and hold the shaft mounting portion 3B. In this case, because the holding member 19 is kept in a diameter expansion state, the holding member 19 is unable to pass through the penetrating hole 4.

Figure 4B:
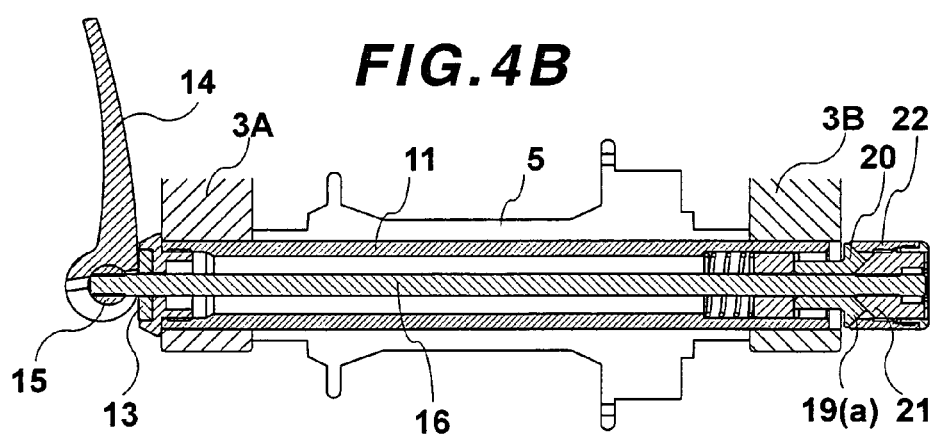
Figure 4C:
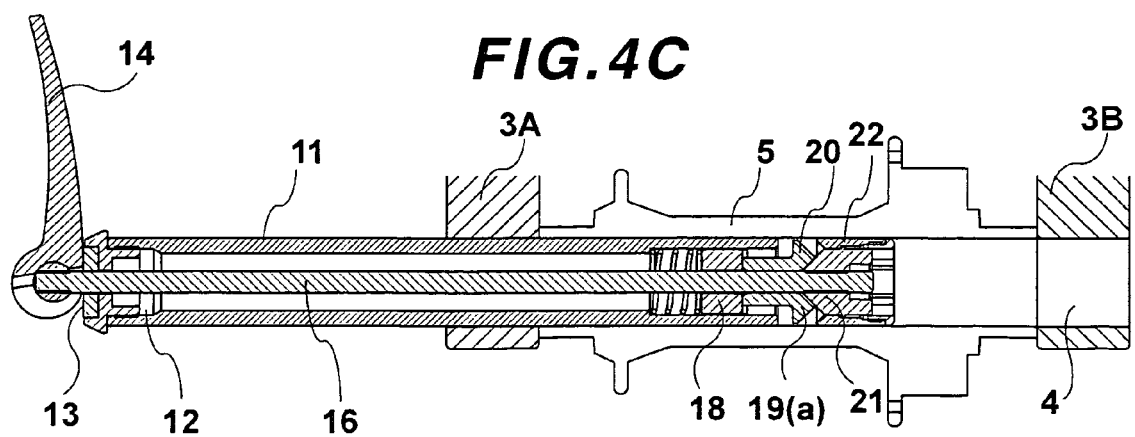

Next, as shown in FIG. 4B, the shrinking member 22 is moved leftward as shown in the diagram. By this operation, because the inner taper surface 22a of the shrinking member 22 presses the slant surfaces 20a in the flange part 20 of each partition piece 19a of the holding member 19, the respective partition pieces 19a approach each other so as to shrink its diameter. Accordingly, it becomes possible to make the holding member 19 pass through the penetrating hole 4 of the shaft mounting portion 3B. Thereafter, as shown in FIG. 4C, the axle assembly 10 can be dismantled by pulling it out of the hub and the shaft mounting portion 3B.

As described in the above explanations, because the axle assembly 10 of the present invention can be easily mounted and dismantled on forks by one touch without designing a breach on the tubular body, it is possible to obtain excellent installation strength.

Figure 5:
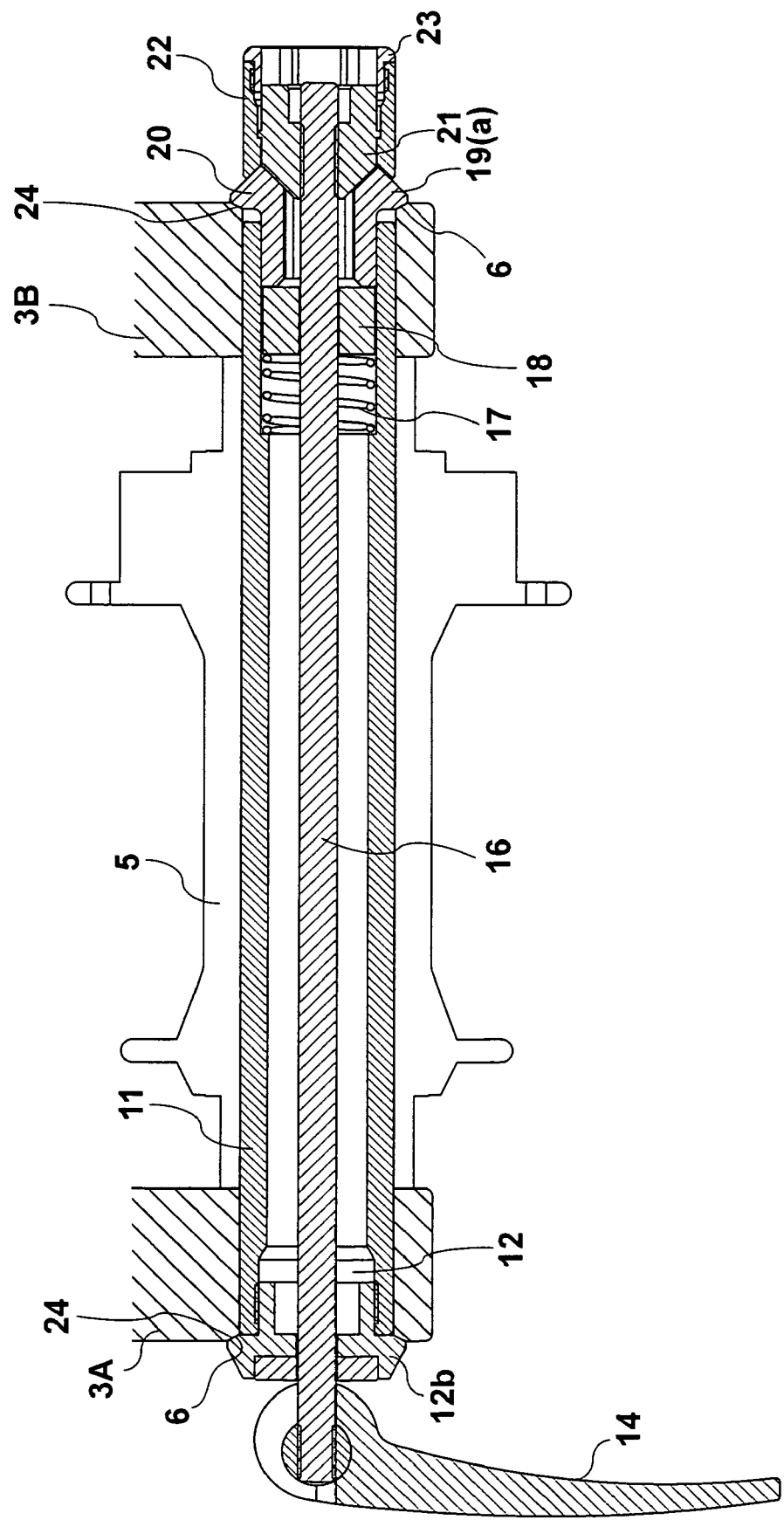
FIG. 5 is a sectional view related to transformation embodiment of an axle assembly of the present invention.

FIG. 5 is a sectional view showing a transformation embodiment of the axle assembly 10 related to the present invention.

In the transformation embodiment, taper surface 6 is designed on the edge of the penetrating hole 4 of both shaft mounting portions 3A and 3B, and taper surface 24 is designed to surface-contact with the taper surface 6 on flange parts 12B and 20 of both holding members 12 and 19. Accordingly, in a state that the axle assembly 10 is mounted onto both shaft mounting portions 3A and 3B, because the taper surface 6 contacts with the taper surface 24, it is possible to increase the strength of installation.

In the above embodiment, the fastening bar 16 is moved using the cam lever 14; however, instead of the cam lever 14, it is possible to furnish a rotatable operating section on one end of the tubular body 11, to screw the fastening bar 16 into the operating section and to move the fastening bar 16 by a rotation operation of the operating section.

Further, instead of the above-mentioned coil spring 17, a spring section may also be furnished on the guide block 18.

Furthermore, it is possible to integrate the bottoms of plural partition pieces 19a in the holding member 19 so as to leave out the guide block 18.

What is claimed is:

1. An axle assembly, comprising:
    a tubular body that is insertable into respective first and second penetrating holes formed on a pair of shaft mounting portions, and which is adapted to rotatably support a wheel hub;
    a first holding member that is installed on a first end of the tubular body, for pressing an edge of the first penetrating hole;
    a fastening bar that passes through the first holding member and is positioned inside the tubular body;
    a moving means that is positioned adjacent to the first holding member, and being connected to a first end of the fastening bar, for axially moving the fastening bar within the tubular body;
    a second holding member, that has a plurality of partition pieces that collectively form a collet shape, and protruding from a second end of the tubular body, the plurality of partition pieces being expandable and contractible so as to change a diameter of the second holding member;
    a pressing means that is connected to a second end of the fastening bar, for pressing against the second holding member when the fastening bar is axially moved so as to press the respective partition pieces against an edge of the second penetrating hole; and
    a diameter shrinking member that is sleeved over the pressing means and being movable towards the second end of the tubular body to couple with the plurality of partition pieces thereby reducing the diameter of the second holding member.

* * * * *